3,429,204
TWIST DRILL DRIVE
Edward W. Smith, 47 Lovell Road,
Melrose Highlands, Mass. 02177
Continuation-in-part of application Ser. No. 452,627,
May 3, 1965. This application Aug. 23, 1967, Ser. No.
663,929
U.S. Cl. 77—5          9 Claims
Int. Cl. B23b *41/00;* B24b *9/00;* H02k *33/00*

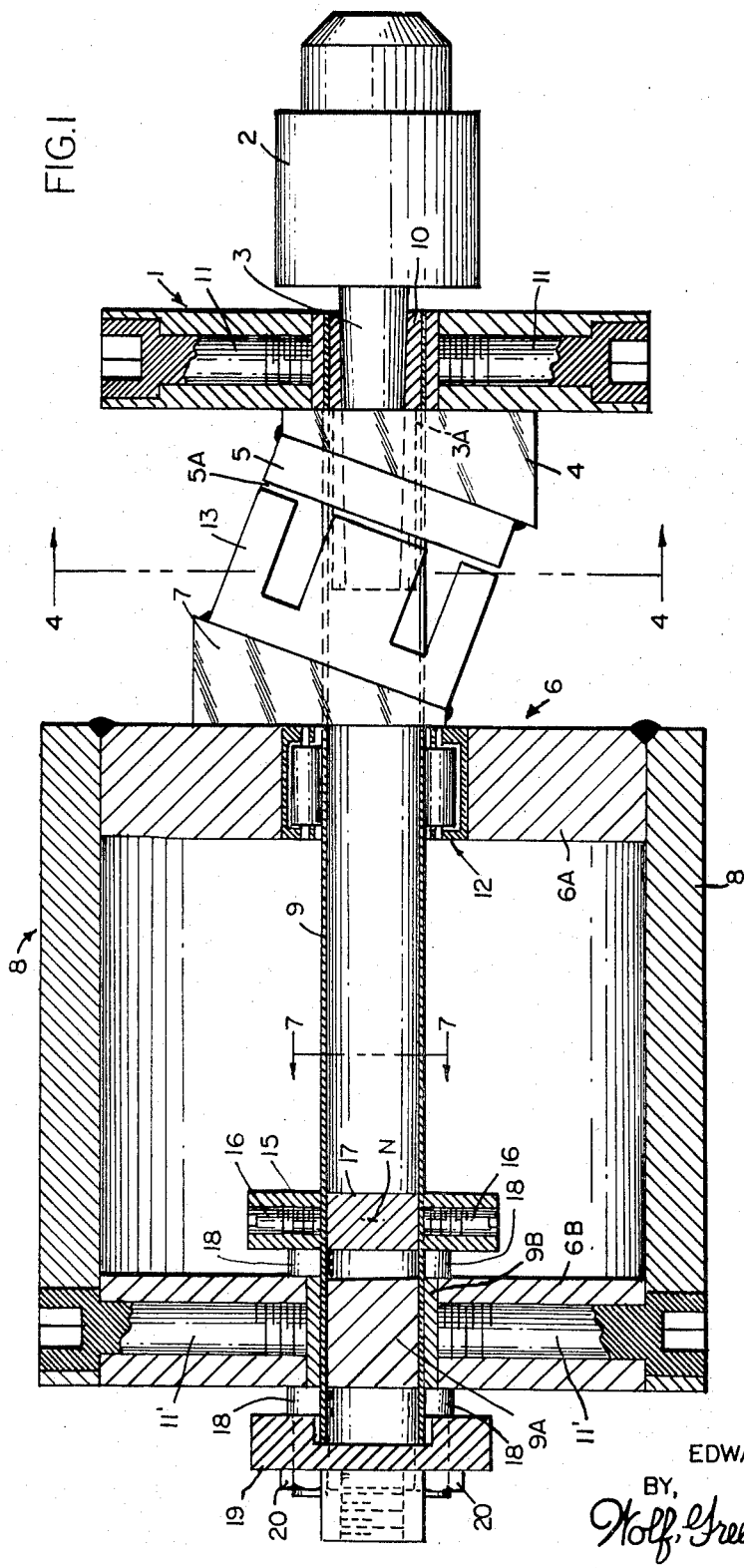
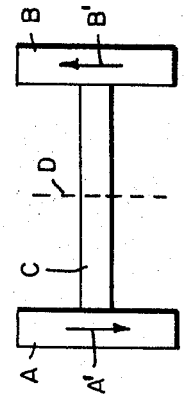

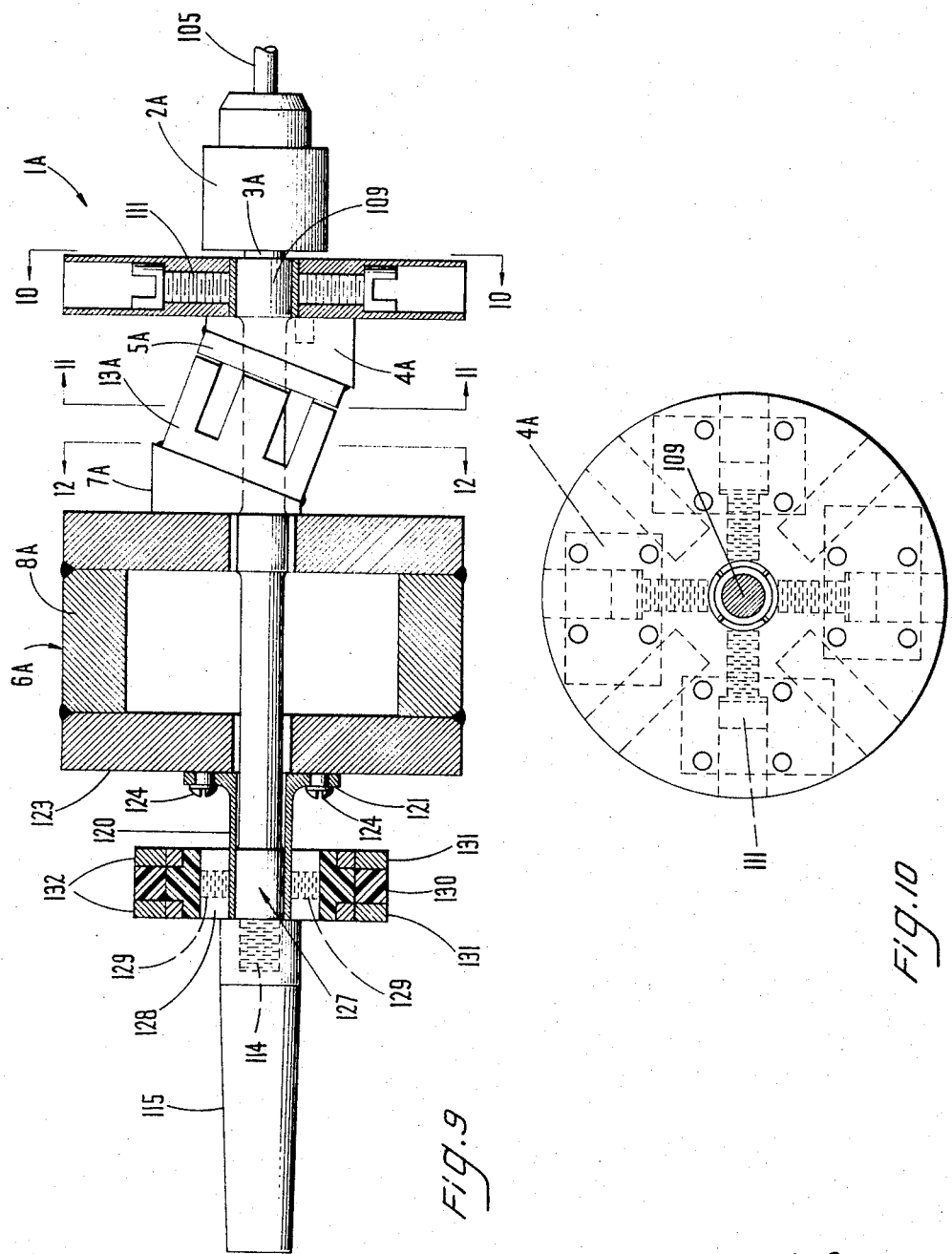

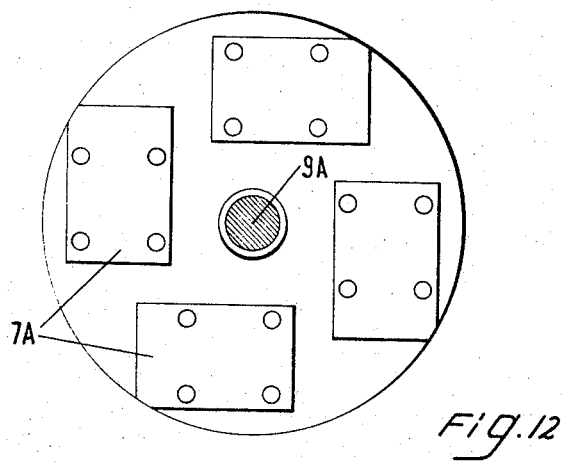
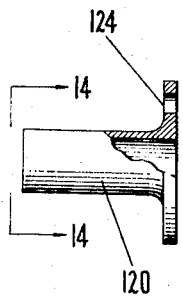 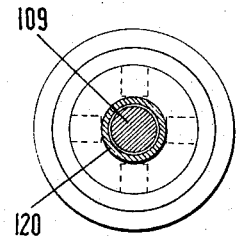 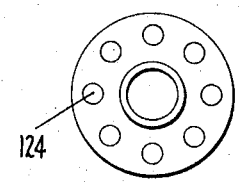
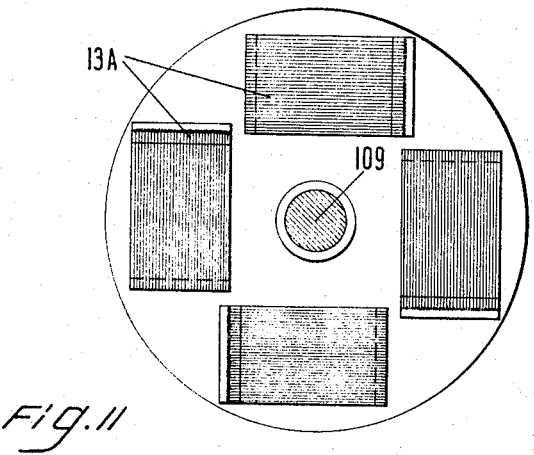

ABSTRACT OF THE DISCLOSURE

A twist drill drive mechanism having a pair of inertia elements interconnected by a torsion shaft with means for maintaining these inertia elements in torsional oscillation at the resonant frequency of the mechanism. The torsion shaft has a nodal point at the resonant frequency of the mechanism and this drill is supported at the nodel point by means for rotating the mechanism. Means are provided adjacent or near one of the inertia elements for securing a drill bit.

*Cross reference to related application*

This application is a continuation-in-part of application Ser. No. 452,627, filed May 3, 1965, now abandoned.

*Background of the invention*

The present invention relates to a means for drilling holes in metal and the like and more particularly, to the means for drilling holes in which the ratio of the depth to the diameter of the hole is large and may be in the order of 150/1.

The present invention provides a more effective means and method for deep-hole drilling in metals and other hard substances. One of the principal problems encountered in such drilling is that of removing chips from the cutting edges of the drill. This problem is occasionally attended to by periodically backing the tool away from the work, or by passing oil down the hole and around the cutting edges, or by a variety of other means. While backing the drill out of the hole is perhaps the simplest and most common method of solving this problem, and is reasonably efficacious, it nonetheless is time-consuming and necessitates frequent attention from an operator.

*Summary of the invention*

The present invention is designed to overcome problems attendant to deep-hole drilling including the problem set forth above.

One object of the present invention is to provide a means and method for rapid period and automatic retraction of the cutting edge of the drill from the surface of the work being cut without the required attention of the operator. This retraction is attained without actually withdrawing the drill itself from the hole being drilled and, consequently, results in a more rapid and accurate drilling than heretofore possible in deep-hole drillings.

A further object of the present invention is to provide an improved support and actuating mechanism for a twist-drill which periodically retracts the cutting edge of the drill from the surface being cut at a rate designed particularly for the material being cut.

A further object of this invention is to provide a mechanism which may be used on a drill press between the drill chuck and quill, without interfering with normal operation of the drill press, for torsionally oscillating and rotating a drill attached thereto.

A further object of this invention is to provide a means for precisely controlling the extent of retraction or withdrawal of a drill from the wall of a hole being drilled for purposes of removing shavings and chips while the drill is rotating.

A further object of this invention is to provide an inexpensive and compact attachment for a drill press for use in torsionally oscillating and rotating twist drills with the mechanism adapted to be secured between the chuck and the usual spindle of the drill press.

A further object of this invention is to provide a means for periodic withdrawal of the cutting edge of the drill from a surface in the hole being cut without back reaction on the rotating spindle of the drill press.

In the present invention there is provided a twist drill drive mechanism comprising a pair of inertia elements that are interconnected by torsion means preferably consisting of a torsion shaft. Means are provided for maintaining the inertia elements in torsional oscillation at the resonant frequency of the mechanism or system. The torsion shaft has a nodal point, when the mechanism is in its dynamic state. Means for rotating the torsion shaft are secured at the nodal point. A twist drill may be engaged by one of the inertia elements for oscillating and rotary movement therewith.

*Brief description of the drawings*

FIG. 1 is a cross-sectional elevation of the present invention;
FIG. 7 is a cross-sectional view taken substantially along the line 7—7 of FIG. 1;
FIG. 8 is a schematic diagram useful in understanding the operation of the present invention;
FIG. 9 is a cross-sectional elevation of a preferred embodiment of the present invention;
FIGS. 10 to 12 inclusive are cross-sectional views taken along the lines 10—10, 11—11, and 12—12 respectively of FIG. 9;
FIG. 13 is a fragmentary elevation of a component of the embodiment of FIG. 9;
FIG. 14 is an end view taken on the lines 14—14 of FIG. 13;
and
FIG. 15 is an end view of the component of FIG. 13 taken from the end opposite FIG. 14.

*Description of the preferred embodiment*

Figure 2:
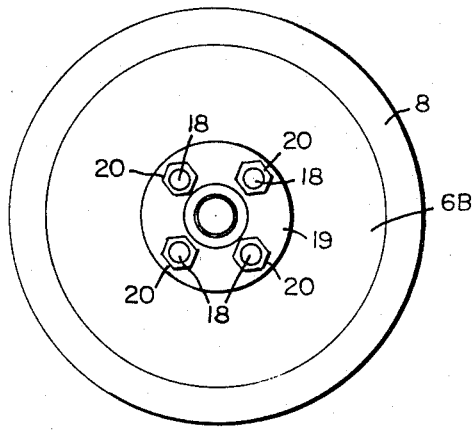
FIG. 2 is an end view looking from the left of FIG. 1.
Figure 3:
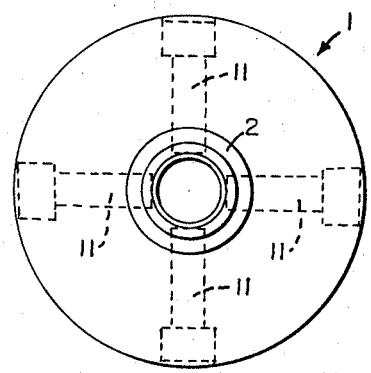
FIG. 3 is an end view looking from the right of FIG. 1.
Figure 4:
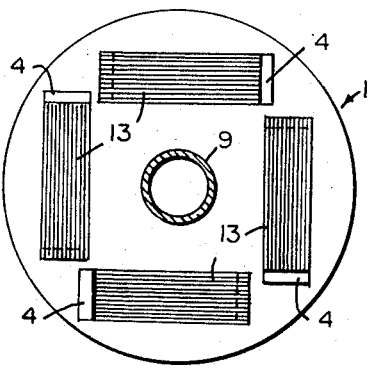
FIG. 4 is a cross-sectional view taken along the line 4—4 of FIG. 1.

FIGURE 8 illustrates the function of the mechanical system embodying the present invention which is designed to generate a motion in a drill sufficient to slightly oscillate the cutting edge of the drill toward and away from the surface being cut using a torsionally resonant mechanical system of the two-inertia type. Such a system consists essentially of two inertias, A and B which are interconnected solidly by a torsion shaft C. This system has a natural period of oscillation which is determined by the size of the two inertias and by the stiffness of the torsion shaft. The oscillation of the two inertias are torsional and at any particular instant the torsional movement of the inertial element are represented by the arrows $A^1$ and $B^1$. When inertia A is turning in a clockwise direction—such as represented by arrow $A^1$—inertia B is turning in a counter-clockwise direction, as represented by arrow $B^1$. If these two inertias, A and B, and their interconnection torsion shaft C are provided with electromagnetic means interposed between them which will tend to maintain the system in oscillation at the resonant frequency of the system, the inertia elements A and B will oscillate in torsion for as long as the system is energized. The angular amplitude of torsional movement in such a case is determined by the amount of energizing current in the electromagnetic system. From a consideration of this schematic diagram, it should be apparent that if the two inertia elements A and B are moving in opposite directions at any particular instant, there must of necessity be a point such as indicated at D along the torsion shaft C where the two torques balance and there is no motion. This point or line D is known as the "nodal point" and its actual position is determined and depends upon the relative sizes or masses of the two inertia elements. If the two inertia elements are of equal size, the nodal point will be halfway between them. If they are not of equal size, the nodal point moves in the direction of the larger inertia element so that the distances from the nodal point to each of the two inertia elements is inversely proportional to the size of the inertia elements.

Even though the system may be in torsion oscillation, the system may as a whole be rotated at any desired speed without any reaction back on the source of the rotational motion if the rotational motion is connected to the system at the nodal point. By proper design the nodal point may be positioned at a convenient location intermediate the inertia elements.

The present invention is designed so that a standard type of chuck and drill is connected to and may in fact form a portion of one of the inertia elements. Means for rotating the drill are connected not directly to the drill, but rather to the nodal point of the system. By connecting the rotating means to the nodal point of the system, the drill may be made to speed up and slow down in its overall rotation without reacting on the rotating drive and without interfering with the torsional oscillation of the system. The drill may even be reversed in direction depending upon the angular amplitude of oscillation of the mechanically resonant system of which the drill is a part.

In the specific embodiment of this invention herein illustrated, the inertia element 1, corresponding with either inertia element A or inertia element B of FIGURE 8, consists of the chuck 2, its tapered shank 3, the angle blocks 4, and the armature laminations 5. The other or backing inertia element 6 corresponding with the other of the two inertia elements A or B of FIGURE 8, includes angle blocks 7 and the cylindrical-shaped body 8. The shaft or torque tube 9 performs the function of a stiffness element corresponding to the element C of FIGURE 8. Theses three major elements, the inertia element 1, the backing inertia element 6, and the torque tube 9, make up the essential elements of a two-inertia torsionally resonant system whose natural period of vibration is determined by the physical constants of the system mentioned above.

The chuck 2 which forms a portion of the inertia element 1 may be of conventional design and is adapted to receive and secure a standard metal twist drill (not shown). The tapered shank 3 may form an integral portion of the chuck 2 and is adapted to slide into and be frictionally and rigidly engaged by the sleeve element 10. This sleeve element 10 in turn snugly fits within and is concentric with one end of the torque tube 9. The outer surface of sleeve 10 fits in facing relation with the inner surface of the torque tube 9 at the right end of the torque tube (as viewed in FIGURE 1) for the portion of the tube 9 that is included within the inertia element 1. Beyond this portion indicated by the numeral 3A, the outer surface of the sleeve 10 is relieved or tapered from the inner surface of the torque tube 9 so that there is no additional contact with the torque tube from point 3A to the free end of the sleeve 10. This tapering of the sleeve 10 avoids undesired interference with the movement of the torque tube 9. The sleeve 10 has a tapered hole which receives and rigidly secures the tapered shank 3 of the chuck thereby forming a solid and rigid interconnection between the tube 9 and the chuck.

The inertia element 1 may comprise a solid disc-shaped mass of metal having preferably four radially arranged holes. The bolts 11 extend radially through the holes in the inertia element 1 and firmly secure this inertia element to one end of the torque tube 9. These bolts squeeze the inertia element 1 toward the sleeve 10 and rigidly clamp the end of the torque tube 9 between the inertia element 1 and the sleeve 10. These rigidly interconnected elements together with the angle blocks 4 and armature laminations 5 form a first inertia element or mass that is rigidly supported and secured to one end of the torque tube 9.

The torque tube 9 is preferably tubular in construction. It has been found that providing a tubular stiffness element rather than a solid cylindrical rod materially reduces the overall length of the unit.

The other or backing inertia element 6, comprises a disc-shaped mass 6, which is concentrically supported with respect to the torque tube 9 by means of a bearing element 12. The bearing element 12 may comprise any suitable means for permitting free rotation or oscillation of the torque tube 9 with respect to the disc portion 6A of the inertia element 6. This bearing element may, for example, comprise a roller-bearing surface that permits free movement of the bearing with respect to the outer surface of the tube 9 at its point of contact. The periphery of the disc-shaped mass 6A is rigidly secured to the cylindrical body 8 which also forms a part of the backing inertia element of the system. Preferably, the disc-shaped member 6A is secured to the inner periphery of the cylindrical-shaped body 8 at one end. The other end of the cylindrical-shaped body is secured to the disc-shaped member 6B. The cylindrical-shaped body 8 is secured to these members 6A and 6B by welding or other suitable means. The disc-shaped member 6B is provided with a plurality of radially arranged holes, preferably four in number. Bolts 11¹ extend radially through each of these holes and solidly secure the inertia element 6, including the disc-shaped members 6A and 6B and the cylindrical-shaped body 8 to the other end of the torque tube 9. This solid connection may be provided by a cylindrical, solid, backing element 9A, having an outer surface that conforms to and fits in snug engagement with the inner surface of the torque tube 9 at the other end. This backing member 9A is substantially colinear with the thickness of the disc-shaped member 6B. A sleeve 9B fits over the torque tube 9 and is longitudinally coextensive with the backing element 9A. The inner surface of the sleeve 9B fits snugly against the outer surface of the torque tube 9. The outer surface of the sleeve 9B receives the ends of the bolts 11¹. Since the proper operation of the resonant system depends heavily upon there being a solid connection between the torque tube 9 and the two inertia elements, the connections therebetween should be made solid and not subject to slippage except, of course, where specifically desired as for example between the bearing surface 12 and the torque tube 9.

Means for electromechanically generating torsional oscillations are provided by the E-shaped field lamination blocks 13 and the mechanism and elements associated therewith. This means is generally of the type described in United States Letters Patent No. 2,604,503, issued July 22, 1952, to E. W. Smith for a torsionally oscillating rotating roll. In this construction, E-shaped field lamination blocks 13 are solidly secured to the backing inertia element 6 by means of angle blocks 7. These angle blocks 7 are preferably wedge-shaped with the angle between the surface secured to the disc-shaped member 6A and the surface to which the E-shaped block 13 is secured, being approximately 20°. Preferably, four such angle blocks and field lamination blocks 13 are provided and these are arranged radially about the disc-shaped member 6A at 90° angles to one another. The surface of the block 7 secured to the disc-shaped member 6A is rectangular, with the longitudinal dimension normal to a radius from the axis of the torque tube 9. The field lamination blocks 13 also have an overall length and width conforming to the rectangular shaper of the angle blocks 7. The lamination blocks 13 are provided with coils (not shown) which are wound about the middle leg of the E-shaped block. These coils are suitably connected by means (not shown) to an alternating current source for energization of the lamination blocks 13 for the purpose of generating a magnetic field. The armature blocks 5 are rectangular in shape and may be formed of a plurality of laminations. One armature block is provided for each of the E-shaped field lamination blocks 13 and is supported with one face parallel to and closely spaced from the ends of the legs formed by the E-shaped lamination blocks with an air gap 5A between the armature blocks 5 and the lamination blocks 13. The armature blocks 5 are in turn secured to angle blocks 4 which are similar in shape, configuration and number to the angle blocks 7. The angle blocks 4, however, are rigidly secured to the disc-shaped member forming the inertia element 1. The angle blocks 4 are radially arranged about the disc-shaped member forming the inertia element 1 in a manner similar to the arrangement of the angle blocks 7 on the disc-shaped member 6A.

When the coils wrapped about the lamination blocks 13 are energized, they exert a pull between the E-shaped blocks and the armature blocks 5. Since these two sets of magnetic elements are disposed at an angle with respect to the angle of oscillation, they provide a component of force which, in effect, tends to twist the two ends of the torque tube in opposite directions. Thus, if a pulsating current is supplied to the above windings which has a frequency corresponding to the natural period of vibration of the mechanically resonant system, the latter will be set into vibration and maintained at an amplitude of vibration which will depend upon the magnitude of the current impulses supplied. The angular amplitude of vibration may be any reasonable value and may be selected by adjusting the magnitude of the current impulses, using a rheostat or other suitable means (not shown) connected to the input circuit of the coils. Since the system as a whole will normally be rotated during use, these current impulses may be delivered to the coils via slip rings (not shown) but may be placed as shown in FIGURE 1 of the above mentioned Patent No. 2,604,503.

The natural period of vibration of the system is related to the other constants of the system by the equation $$F = 3400(d)^2 / WK^2 L$$

where F is the natural period of torsional vibration of the system in cycles per second to that portion of the system on either side of the nodal point $WK^2$ is the inertia in pound/inches² of the inertia of that end of the system; L is the distance in inches from the nodal point to the inertia under consideration and $(d)$ is the diameter of a solid cylindrical steel equivalent of whatever shape of torsion shaft is to be used. Since the frequency of the other side of the system must necessarily be the same, and the torsion shaft will usually be the same diameter throughout its length, the size of the other inertia element and its distance from the nodal point may then be determined for any given set of conditions. As will appear from the above, the minimum overall length of the torsion shaft will be obtained when the backing inertia element is made large with respect to the other inertia element which might be termed the working inertia. Such an arrangement is illustrated in the accompanying figures.

Figure 5:
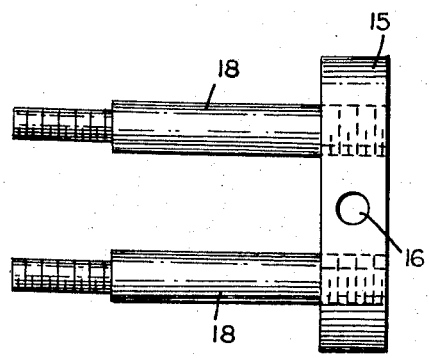
FIG. 5 is a detail of an element shown in FIG. 1.
Figure 6:
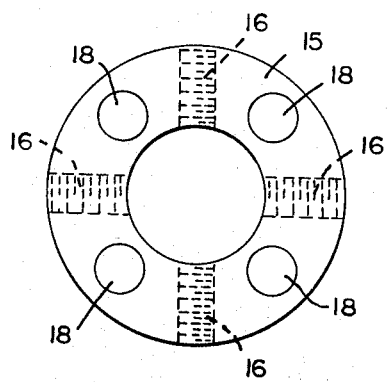
FIG. 6 is an end view of the element shown in FIG. 5 looking from the right.

The nodal point of the system illustrated in FIGURE 1, is indicated by the letter N. This nodal point N occurs at a point intermediate to the two inertia elements 1 and 6, and is the location at which the torque necessary to rotate the system as a whole must be applied if the system as a whole is to be rotated without interference with the oscillating motion and without back reaction. For this purpose, a ring-shaped element 15 is formed with an aperture through which the torque tube 9 passes. The ring-shaped element and the torque tube are coaxial and are secured together at the nodal point by a plurality of set-screws 16 (preferably four in number) which project radially through the ring-shaped element 15 into pressure engagement with the outer surface of the torque tube 9. These set-screws 16 squeeze the torque tube between the ring-shaped element 15 and the tube-support element 17. The tube-support element 17 is a solid, cylindrical member positioned within the torque tube 9 and is colinear with the ring-shaped element 15. This support element 17 provides a backing means for the thin walled torque tube. Outwardly extending rods 18, best illustrated in FIGURES 5 and 6, project rearwardly from the ring-shaped element 15 through the backing inertia disc-shaped member 6B to a second ring-shaped element 19. The rods 18 pass through enlarged openings in the disc-shaped member 6B, and do not touch it at any time either in the dynamic or static condition of the device. The rods 18 are secured to the ring-shaped element 19 by means of nuts 20. The ring-shaped element 19 is coaxial with the torsion tube 9 and is positioned in longitudinal alignment with it but does not engage the tube directly. The element 19 is formed with a threaded boss or stud that is adapted to be engaged and rotated by a suitable spindle forming a part of the drill press (not shown).

The natural period of torsional oscillation chosen for the particular system designed is a matter of choice that depends upon the material being cut, the angular amplitude of oscillation desired, the number of oscillations per minute desired, etc. In general, it may be said that the higher the frequency of oscillation, the greater the number of periodic withdrawals the cutting edges of the drill from the area to be cut, and the higher the withdrawal velocity for a given amplitude of vibration. In the configuration illustrated, a frequency of 60 cycles per second was chosen as a good, all-around figure, because it provides a large number of withdrawals per minute at velocities which can be made quite large even for small drills, and because it is convenient to derive the pulsating current impulses required directly from the 6-cycle alternating current electric power lines which prevail in this country. Other frequencies and sources of electric impulses required may be obtained from other sources.

Referring now to FIGS. 9 to 15 inclusive, there is illustrated a preferred embodiment of the invention which is designed to minimize the distance between drill tip and the nodal point at which the device is supported. As previously discussed, for most efficient operation rotary motion should be applied to this system at the nodal point so as to eliminate any back reaction on the rotary source of energy caused by the vibrational motion superimposed on the rotational motion. But in arranging the system in this fashion care should be taken to make the unsupported portion of this system extending from the nodal point as short as possible to reduce the likelihood of eccentric rotation of the drill, which results from any imperfections in manufacture. The overall length of the vibratory drive which is in effect introduced between the source of rotational energy and the drill itself, may be minimized as illustrated in FIGS. 9 to 15 inclusive, with the consequent reduction in the likelihood of eccentric rotation by the arrangement shown in these figures. In this arrangement, numbered elements followed by the suffix A correspond with like numbered components in the previously described embodiment. The inertia element 1A corresponding with either inertia element A or inertia element B of FIG. 8, consists of the chuck 2A, its tapered shank 3A, the angle blocks 4A and the armature laminations 5A. The other, or backing, inertia element 6A corresponding with the other of the two inertia elements A or B in FIG. 8, includes angle blocks 7A, the cylindrical shaped body 8A, and the E-shaped field lamination blocks 13A. The inertia element 1A may be suitably secured to a torsion shaft 109 by means of a series of radially extending setscrews 111 having inner ends that are tightened into firm relationship with the torsion shaft 109. The tapered shank 3A of the chuck fits into an appropriate slot or recess in the free end of the torsion shaft 109 where it may be secured by suitable means. A cutting device or drill 105 is in turn secured by conventional means in the end of the chuck 2A. The torsion shaft 109 which may, if desired, be solid or tubular extends through an appropriate set of aligned openings in the cylindrical shaped body 8A. If desired, this shaft 109 may freely pass through these openings in spaced relationship to the inner walls thereof or, alternately, if desired bearing members may be provided for appropriately spacing the inner walls of the cylindrical shaped body 8A from the surface of the shaft 109. This elongated torsion shaft 109 is provided with a threaded end illustrated at 114. This threaded end is engaged by a tapered member 115 adapted to fit into and be secured by conventional, drill-press chucks so that torsion shaft 109 will rotate wth the rotation of the drill-press chuck at any reasonably desired speeds.

This torsion shaft 109 forms one segment of a torsion tube or like member. The other segment of the torsion tube is formed by the tube 120. This tube 120 is provided with a flared or flanged end 121, which is suitably and rigidly secured to side wall 123 of the cylindrical shaped body 8A by suitable means such as screws 124. The inner surface of this tube 120 is spaced from the outer surface of the torsion shaft 109 except at the end 127 of this torsion shaft 109. At this end 127, the shaft 109 and tube 120 are rigidly interconnected by a series of setscrews 129 which extend through the ring 128 and securely hold these two components 109 and 120 in rigid and fixed interrelation at the end 127 of tube 109. A dielectric rig 130 is provided with a pair of spaced contact rings 131 that extend annularly about the cylindrical tube 120 and are suitably connected by wires not shown for conveying power to the E-shaped field lamination bocks 13A. Power is supplied through these annular rings 131 to the E-shaped field lamination block 13A by brushes 132 suitably mounted on a dielectric ring and surrounding the rings 131. Other suitable supports, not shown, may be provided for supporting these components.

In this arrangement, the inertia system formed on the one hand by the inertia components previously classified as inertia elements A or B, counterbalance one another and provide a resonance system having a nodal point in which one-half of the system vibrates in one direction and the other in a directly opposite direction. Under these conditions, forces at the nodal point which are in the center plane through setscrews 129 are in balance. To this extent, the construction of FIGS. 9 to 15 is the same as the construction of FIGS. 1 to 8. However, the stiffness system is modified to permit the shortening of the overall structure.

In this arrangement, the stiffness element for the compensating or backing inertia comprises the tube 120 which surrounds the main torsion shaft 109, which not only provides a rigid member supporting the drill and chuck, but also provides the stiffness needed to make the drill-chuck assembly resonant at the desired frequency. The tube 120 has sufficient torsional stiffness to make the compensating inertia resonant at the same desired frequency. The net result of this is that the nodal point is now no longer betwen the inertias as was the case in the previously discussed embodiment of the invention. Rather, the nodal point is external to those inertias, and, as illustrated in FIG. 9, appears to the left of the inertias 1A and 6A. The inertia in this arrangement is located where a more stable connection to the drill press or other driving source can readily be provided. Thus, the overall length of the arrangement is reduced, and a much more rigid connection between the drill press quill and the drill itself is possible.

What is claimed is:

1. A twist drill drive comprising:
a pair of inertia elements,
a torsion shaft interconnecting said elements,
means for maintaining said elements in torsional oscillation at the resonant frequency of said mechanism,
said torsion shaft having a nodal point when said mechanism is maintained in said torsional oscillation at said resonant frequency,
means engaging said torsion shaft at said nodal point for rotating said mechanism, and
means engaging one of said elements for securing a drill thereto.

2. A drive mechanism for a drill as set forth in claim 1:
wherein one of said inertia elements is secured at one end of said shaft and comprises a disc-shaped mass and said means engaging said element for securing a drill thereto, with each coaxially secured to one end of said shaft,
said other inertia element secured to the other end of said shaft and includes a disc-shaped mass, and
said torsion shaft comprises a tubular member.

3. A drive mechanism as set forth in claim 2 wherein:
said means for maintaining said elements in torsional oscillation includes electromagnetic means and an armature means with said electromagnetic means secured to one inertia element and said armature means secured to the other of said inertia elements and lying in facing spaced relation on either side of a plane normal to the axis of said shaft, with said armature means adapted to be moved relative to said electromagnetic means on energization thereof.

4. A drive mechanism as set forth in claim 3 wherein:
said means engaging said element for securing a drill thereto comprises a chuck having means secured to said tubular member, and
said other inertia element includes a second disc-shaped mass coaxial with said tubular member and positioned intermediate said first mentioned disc-shaped masses, of said inertia elements, and a cylindrical body coaxial with said tubular member rigidly interconnecting and secured to said disc-shaped masses of said first inertia element.

5. A drive mechanism as set forth in claim 4 wherein:
said tubular member has a nodal point in the dynamic operation of said mechanism intermediate the disc-shaped masses of said other inertia element, and
said means engaging said torsion shaft at said nodal point includes a ring-shaped element coaxial with and engaging said tubular member at said nodal point, and a plurality of rods freely passing through one of said disc-shaped masses forming said other inertia element, and means connected to said rods adapted to engage a spindle.

6. A twist drill drive as set forth in claim 1 wherein:
said torsion shaft is formed of two elongated segments each connected to one of said inertia elements and arranged at least partially colinear with respect to each other, and
means securing the end of one segment to the other segment.

7. A twist drill drive as set forth in claim 6 wherein:
said one segment is tubular and coaxial with the other segment.

8. A twist drill drive as set forth in claim 6 wherein:
said inertia element connected to said one segment is at least partially colinear with respect to said other segment.

9. A twist drill drive as set forth in claim 6 wherein:
said one segment is a tubular element having an inner surface,
means securing a longitudinal section of said inner surface in fixed relation with said other segment with the remainder of said surface free to oscillate with respect to said other segment.

References Cited

UNITED STATES PATENTS

| | | | |
|---|---|---|---|
| 2,374,718 | 5/1945 | Andrew | 10—136 XR |
| 2,453,136 | 11/1948 | Karweit | 77—32.3 |
| 2,581,311 | 1/1952 | Taylor | 77—32.3 |
| 2,604,503 | 7/1952 | Smith | 310—29 |

FRANCIS S. HUSAR, *Primary Examiner.*

U.S. Cl. X.R.

10—136; 310—29; 51—59; 77—32.3